United States Patent [19]

Kondo

[11] Patent Number: 4,848,642
[45] Date of Patent: Jul. 18, 1989

[54] SOLDERING APPARATUS

[75] Inventor: Kenshi Kondo, Tokyo, Japan

[73] Assignee: Nihon Den-Netsu Keiki Co., Ltd., Japan

[21] Appl. No.: 133,087

[22] Filed: Dec. 15, 1987

[30] Foreign Application Priority Data

| Feb. 12, 1987 | [JP] | Japan | 62-28083 |
| Feb. 12, 1987 | [JP] | Japan | 62-28085 |
| Apr. 3, 1987  | [JP] | Japan | 62-81116 |

[51] Int. Cl.$^4$ .................. B23K 31/02; B23K 1/08
[52] U.S. Cl. ................. 228/37; 118/410; 118/429
[58] Field of Search ........... 228/37; 118/410, 429, 118/74

[56] References Cited

U.S. PATENT DOCUMENTS

| 3,119,363 | 1/1964 | Rieben | 228/37 |
| 3,398,873 | 8/1968 | Wegener | 228/37 |
| 4,465,014 | 8/1984 | Bajka | 228/37 |
| 4,512,508 | 4/1985 | Pachschwöll | 228/37 |
| 4,530,457 | 7/1985 | Down | 228/37 |
| 4,530,458 | 7/1985 | Kondo | 228/37 |
| 4,659,003 | 4/1987 | Simonetti | 228/37 |
| 4,666,077 | 5/1987 | Rahn | 228/37 |
| 4,679,720 | 7/1987 | Sedrick | 228/37 |
| 4,684,056 | 8/1987 | Deambrosio | 228/37 |

Primary Examiner—Kurt Rowan
Attorney, Agent, or Firm—Stephen F. K. Yee

[57] ABSTRACT

An apparatus for soldering printed circuit boards moving along a predetermined path of travel, comprises an upwardly extending nozzle member having an opening at its top end from which molten solder is caused to overflow to form an overflowing molten solder with which the underside surface of the printed circuit board is contacted, and an adjustable outlet member rotatably disposed in the opening to define an outlet extending in the direction transverse to the path of travel, so that by adjusting the angular position of the outlet member the orientation of the outlet may be varied for adjustment of the direction and height of the overflowing solder.

13 Claims, 11 Drawing Sheets

SOLDERING APPARATUS

This invention relates to an apparatus for soldering printed circuit boards.

There have thus far been proposed various soldering apparatuses for printed circuit boards. When applied to printed circuit boards bearing chip type electric parts such as resisters and condensers, however, the known apparatuses invariably give rise to problems of soldering failures due to the recesses defined between adjacent chip type parts or behind the chip type parts as seen in the direction of travel of the boards. Such recesses or space can block the molten solder from flowing thereinto and can trap gases therein, causing incomplete deposition of the solder. The air bubbles, once trapped in the recesses, are difficult to remove even if the molten solder is poured over the printed circuit board over a long period of time.

To cope with this problem, there is proposed in U.S. Pat. No. 4,465,219 a wave soldering apparatus capable of adjusting the direction and height of the solder wave so as to provide optimum contact between the molten solder and the printed circuit boards. An embodiment of this prior art apparatus is shown in FIG. 19 of the accompanying drawings, in which the reference numeral 3 denotes an upwardly converged nozzle member having an overflow outlet 4 extending in the direction perpendicular to the direction shown by the arrow A along which a printed circuit board 1 bearing temporarily mounted chip parts 2 travels. A molten solder 5 is caused to overflow from the outlet 4 to form thereover a solder wave 5a. The front plate of the nozzle member 3 has an L-shaped plate 6 mounted on a V-shaped plate 7 which in turn is mounted on a stationary plate 9. The position of the L-shaped plate 6 is adjustable horizontally in the direction parallel to the direction A of the travel of the printed circuit board 1 while the position of the V-shaped plate 7 is adjusted vertically, so that the orientation and size of the area of the overflow outlet 4 may be varied for the adjustment of the direction and height of the overflowing solder wave 5a.

One problem associated with the above described appratus is that it is troublesome and time consuming to vary the position of the plates 6 and 7. Especially, it is very difficult to control the orientation of the overflow outlet 4.

With the foregoing situations in view, the present invention is aimed at the provision of an apparatus for soldering printed circuit boards travelling along a predetermined path of travel, which permits easy adjustment of the direction of solder wave.

Another object of the present invention is to provide a soldering apparatus which can provide various shapes of soldering wave such as thin solder waves having a high flowing speed suitable for soldering printed circuit boards bearing small outline integrated circuits.

In accordance with the present invention there is provided an apparatus for soldering printed circuit boards moving along a predetermined path of travel, said apparatus comprising:

an open-topped tank located for containing a molten solder;

an upwardly extending nozzle member having the lower end thereof in flow communication with said tank and the upper end thereof defining an opening extending laterally in the direction transverse to said path of travel;

solder feed means operable for supplying said molten solder in said tank to said nozzle member to cause said molten solder to overflow from said opening, with the underside surface of the printed circuit board being contacted with the overflowing molten solder; and outlet means disposed in said opening to reduce the area of said opening and to define a laterally extending outlet, said outlet means being rotatable about an axis oriented transversely to said path of travel so that by adjusting the angular position of said outlet means the orientation of said outlet may be varied for adjustment of the direction of said overflowing solder.

Preferred embodiments of the soldering apparatus according to the present invention will now be described with reference to the accompanying drawings, in which.

Figure 1:
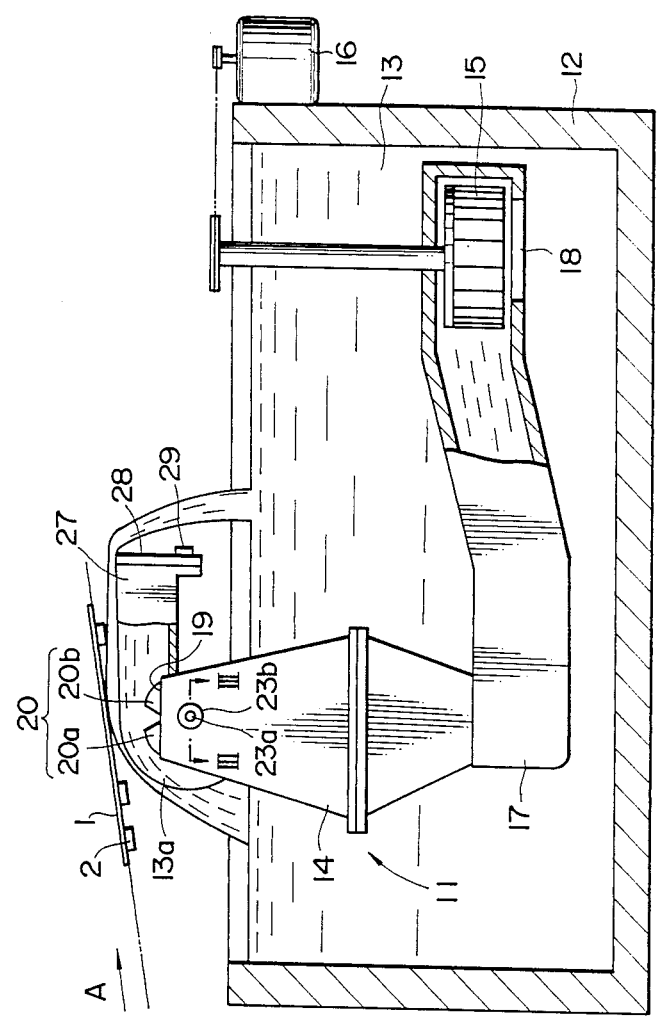
FIG. 1 is a cross-sectional, elevational view diagrammatically showing one embodiment of the soldering apparatus according to the present invention.
Figure 2:
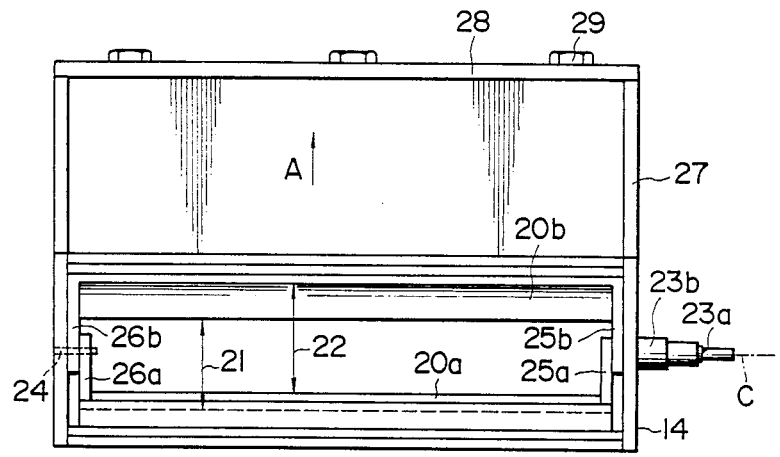
FIG. 2 is a partial, plan view showing the main part of the apparatus of FIG. 1.
Figure 3:
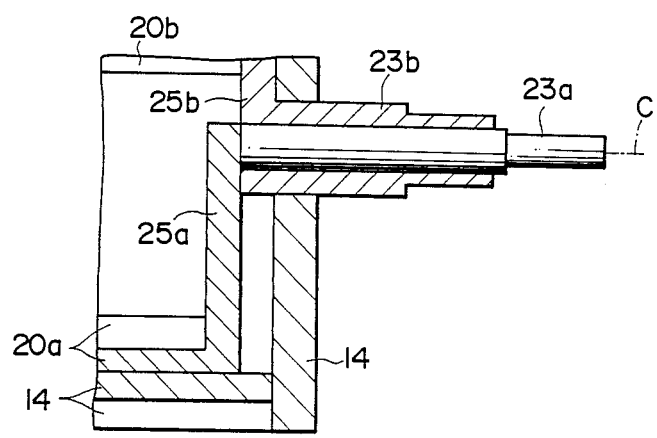
FIG. 3 is a partial, cross-sectional view taken on the line III—III in FIG. 1.

Referring to FIGS. 1-3, the reference numeral 12 denotes a tank which is generally rectangular in shape and which is open on the top side thereof. The tank 12 contains a molten solder or melt 13 which is maintained at a suitable temperature by a heating element (not shown). The melt 13 is applied to printed circuit boards by solder applicator means generally indicated by a reference numeral 11.

Disposed within the tank 12 is an upwardly extending nozzle member 14, the lower end of which is connected to one end of a conduit 17. At the other end, the conduit 17 is provided with a molten solder supply hole 18 which is opened toward the bottom of the tank 12. Consequently, the lower portion of the nozzle member 14 is in flow communication with the tank 12. The nozzle member 14 is formed in a substantially rectangular shape in section and has a sectional area gradually reduced from its middle portion toward its upper tip end. More specifically, of the two pairs of opposing walls which define the configuration of the nozzle member 14, the side plates are disposed substantially parallel with each other but the front and rear plates converge toward the upper end of the nozzle member 14.

A feed means is provided in the tank 12 for continuously supplying the molten solder 13 in the tank 12 to the nozzle member 14. The feed means preferably includes a propeller assembly 15 which is disposed in the conduit 17 adjacent to the opening 18. The propeller 15 is provided with a shaft which is connected to drive means including a motor 16, so that it is rotated about the shaft upon actuation of the motor 16 to supply the molten solder 13 in the tank 12 continuously to the nozzle 14. The supplied molten solder flows upward through the nozzle 14, overflows from its upper end 19 to form an overflowing wave or layer 13a and, then, return to the tank 12.

The opening 19 which is defined at the upper end of the nozzle 14 extends laterally in the direction transverse to a direction A along which a printed circuit board 1 bearing chip type electric parts 2 temporarily attached to its underside by means of an adhesive or solder paste is fed by operation of ordinary transfer means. In this instance, it is preferred that the printed circuit board 1 travel in a rearwardly inclined posture and along a similarly inclined path of travel at an angle of $\theta_1$ with respect to a horizontal plane so that the molten solder excessively applied to the board 1 can drop in a facilitated manner. As the printed circuit board 1 passes over the nozzle 14, its lower side is brought into contact with the overflowing molten solder 13a for soldering the electric parts 2 on the underside of the printed circuit board 1.

Figure 4:
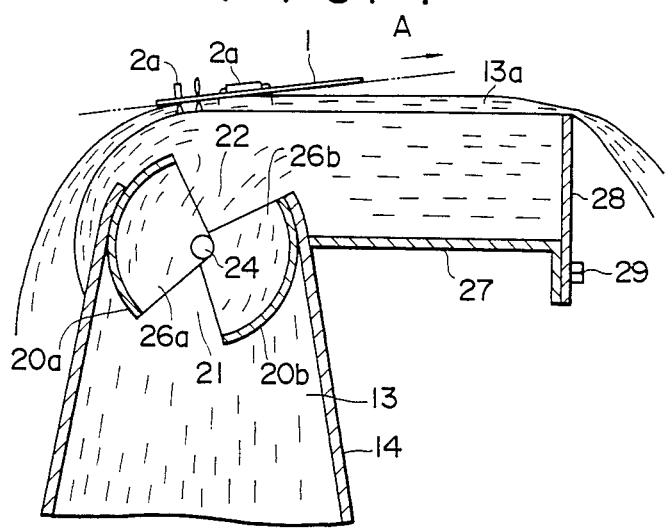
FIGS. 4 through 6 are partial, elevational, cross-sectional views schematically showing various solder wave forms produced by the apparatus of FIG. 1.

Provided within the opening 19 at the upper end of the nozzle 14 is an outlet means 20 to reduce the area of the size of the opening 19 and to define a laterally extending outlet 22 (FIG. 2). The outlet means 20 in this embodiment includes a pair of longitudinally curved or arcked plates 20a and 20b rotatably disposed about an axis C. As shown in FIG. 4, the plates 20a and 20b are disposed to define between them two laterally extending apertures one of which serves as the overflow outlet 22 with the other aperture serving as an inlet port 21 for permitting the molten solder 13 introduced into the nozzle 14 to be passed therethrough to the outlet 22.

The width and orientation of the outlet 22 may be varied by adjusting the positions of the plates 20a and 20b. As shown in FIGS. 2 and 3, the curved plate 20b has connecting plates 25b and 26b at opposing ends thereof. The connecting plate 25b is fixedly secured to an outer shaft 23b which is rotatably received in a bore of one of the opposing side plates of the nozzle 14. The connecting plate 26b, on the other hand, is rotatably supported about a shaft 24 secured to the other, opposite side plate of the nozzle 14. Similarly, connecting plates 25a and 26a are provided at opposite ends of the curved plate 20a. The connecting plate 25a is fixed to an inner shaft 23a which is rotatably received by a bore formed in the outer shaft 23b, while the connecting plate 26a is rotatably supported on the shaft 24. The inner and outer shafts 23a and 23b are concentric with the axis C about which there are rotatable.

Consequently, by rotating the inner and outer shafts 23a and 23b, the curved plates 20a and 20b are rotated about the axis C so that the width and orientation of the outlet 22 defined therebetween may be varied. By adjusting the orientation and width of the outlet 22, soldering operation may be effected in various manner with the single apparatus as shown in FIGS. 4 through 6.

FIG. 4 illustrates a state of the apparatus in which the curved plates 20a and 20b are positioned to form a solder wave suitable for performing flow dip soldering of printed circuit boards which bear electric components having lead wires depending from the underside of the boards. The reference numeral 27 designates a guide plate on which a moving layer 13a of the overflowing molten solder is supported. To the rear end of the plate 27 is fixed a dam plate 28 by means of screws 29. The position of the plate 28 is vertically adjustable for controlling the height of the solder layer 13a. The molten solder in the tank 12 (FIG. 1) is fed to the nozzle 14 and is passed through the aperture 21 to the overflow outlet 22. The overflowing solder forms the layer or wave flowing on the plate 27 in the directions parallel with and opposite to the direction A along which printed circuit boards 1 carrying electric parts 2a travel. The printed circuit boards 1 are brought into contact with the solder wave 13a to effect dip soldering.

Figure 5:
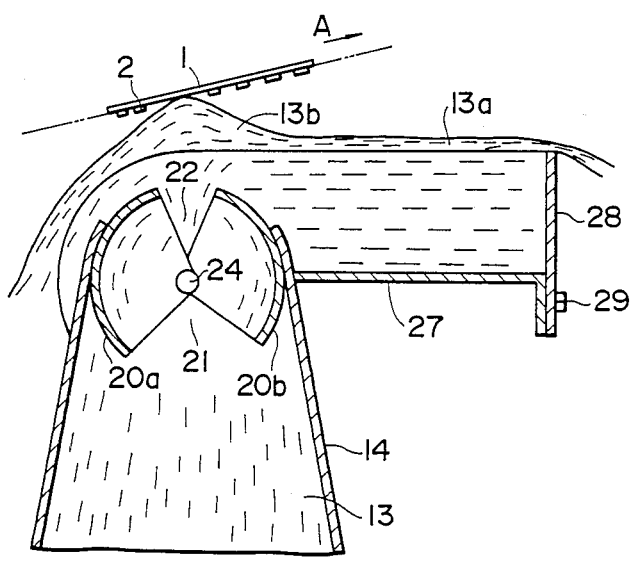

When soldering printed circuit boards bearing chip parts by dip soldering, the overflow outlet 22 is narrowed and is oriented upward as shown in FIG. 5 to form a protruded wave 13b. The printed circuit boards are contacted with the apex portion of the protruded wave 13b.

Figure 6:
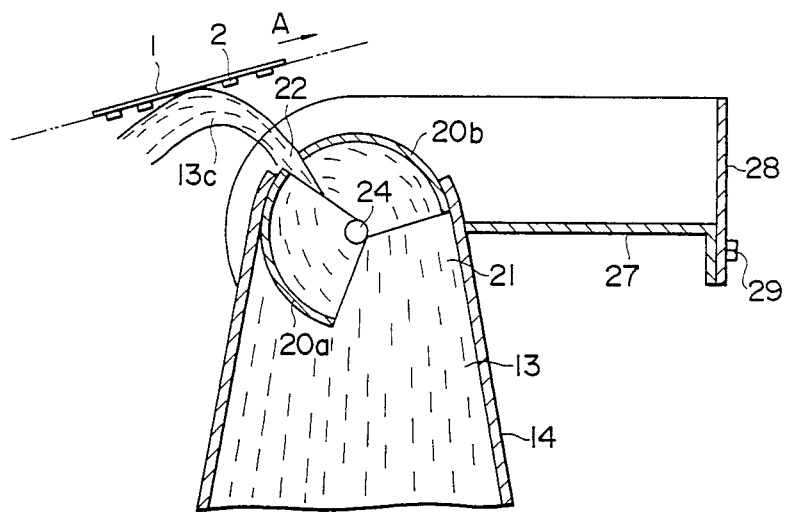

As shown in FIG. 6, by further narrowing the width of the outlet 22 and by orienting the outlet toward the direction opposite to the direction A of the travel of the printed circuit boards, there is formed an overflowing wave 13c extending in the direction opposite to the direction A. Such an overflowing solder wave 13c is effective in preventing the formation of "bridges" and "icicles" of the solder.

In the above embodiment, the connecting plates 25a and 26a, and 25b and 26b have fan-like forms whose peripheral, arcked edges have lengths equal to the peripheral widths of the arcked plates 20a and 20b respectively. However, the connecting plates 25a and 26a, and 25b and 26b may have any desired structure (shape, size and position), although it is preferred that they are positioned at both ends of the arcked plates 20a and 20b and have sizes effective for reducing the amount of the molten solder escaping laterally from the outlet 22.

Figure 7:
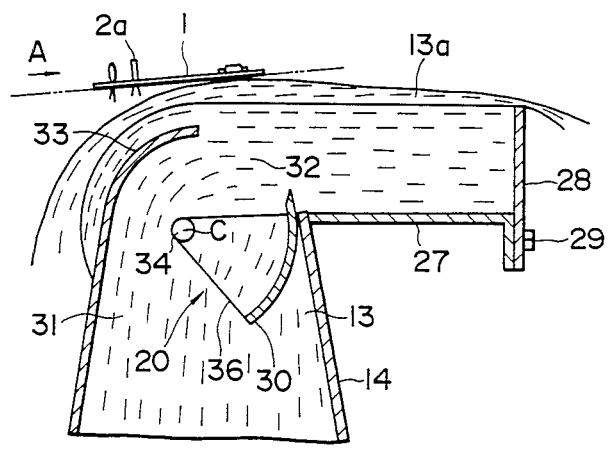
FIGS. 7 through 9 are views, similar to FIGS. 4 through 6, showing showing another embodiment of the present invention.
Figure 8:
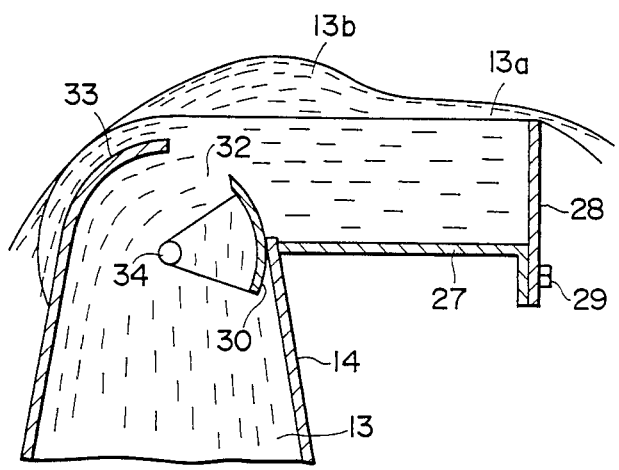
Figure 9:
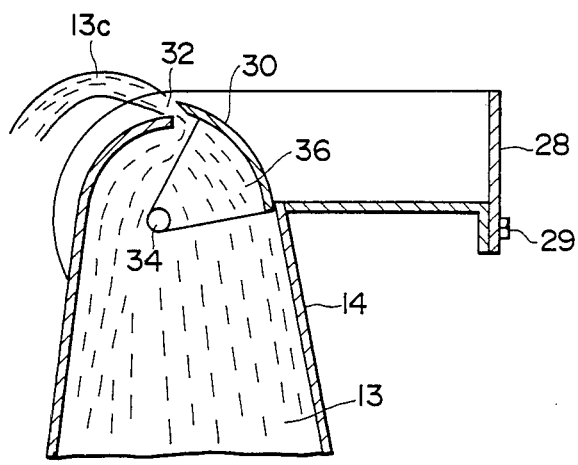

Another embodiment of the outlet means 20 is shown in FIGS. 7 through 9, in which the same reference numerals designate similar component parts. The outlet means 20 in this embodiment includes only one curved plate 30 having a structure similar to the plate 20a or 20b. Thus, the curved plate 30 has a connecting plate 36 at its one end. The connecting plate 36 is rotatably supported by a shaft 34 fixed to a side plate of the nozzle member 14. The other end of the curved plate 30 is connected to a connecting plate (not shown) to which a shaft (not shown) is secured. The shaft is rotatably received by a bore in the side wall of the nozzle 14. Of the two pairs of the side walls constituting the nozzle 14, the front side wall has an elongated upper portion 33 curved in the direction of the arrow A. Between the upper portion 33 and the curved plate 30 is defined an overflow outlet 32. The orientation and the width of the outlet 32 may be varied by adjusting the angular position of the curved plate 30.

When the curved plate 30 is positioned to provide a wide width for the outlet 32, as shown in FIG. 7, there is formed a layer 13a of molten solder similar to that of FIG. 4. As shown in FIG. 8, by narrowing the width, a protruded wave 13b is formed in the same manner as in FIG. 5. In FIG. 9, the width is further narrowed to form an overflowing wave 13c similar to that of FIG. 6.

Figure 10:
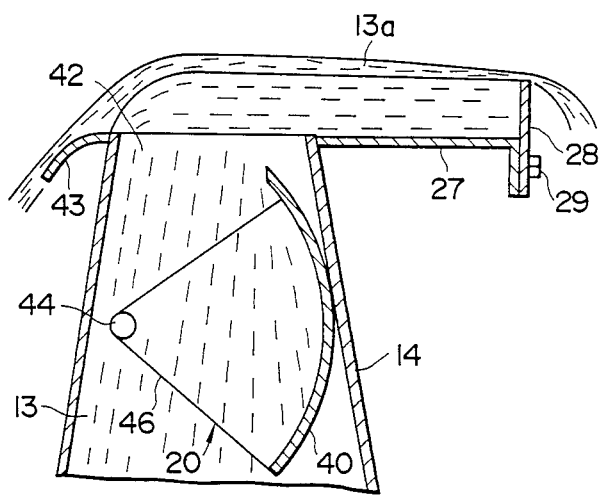
FIGS. 10 and 11 are views, similar to FIGS. 7 through 9, showing a further embodiment of the present invention.
Figure 11:
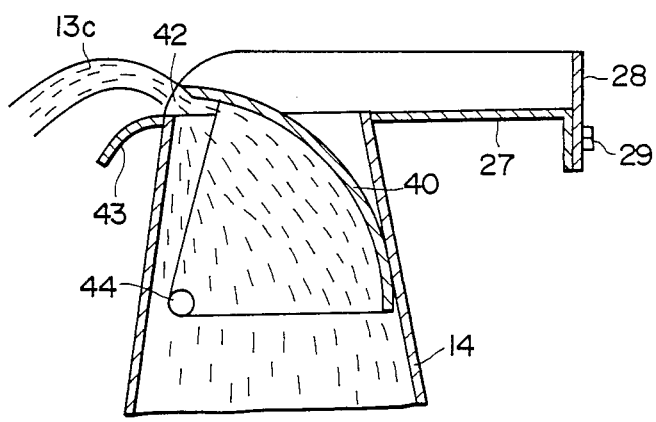

A further embodiment is shown in FIGS. 10 and 11, in which the same reference numerals designate similar component parts. Outlet means 20 in this embodiment includes a curved plate 40 having a structure similar to that of the embodiment shown in FIGS. 7 through 9. The inwardly curved portion 33 of FIG. 7 is removed and replaced by an outwardly extending guide plate 43. When the curved plate 40 is positioned to provide a wide width for the outlet 42, as shown in FIG. 10, there is formed a layer 13a of molten solder similar to that of FIG. 4. As shown in FIG. 11, by narrowing the width, a thin wave 13c is formed in the same manner as in FIG. 6.

Figure 12:
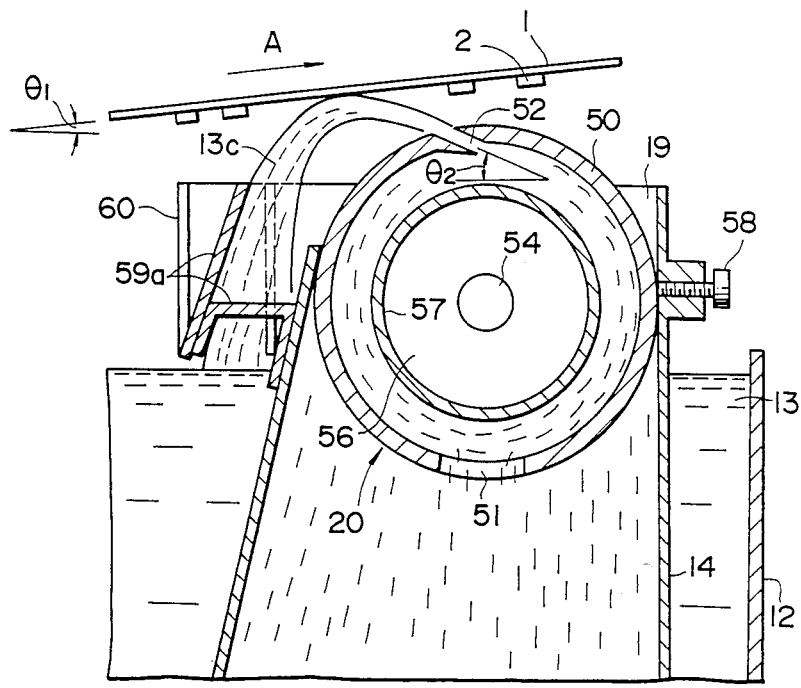
FIG. 12 is a partial, elevational, cross-sectional view taken on the line XII—XII in FIG. 13 showing a further embodiment of the present invention.
Figure 13:
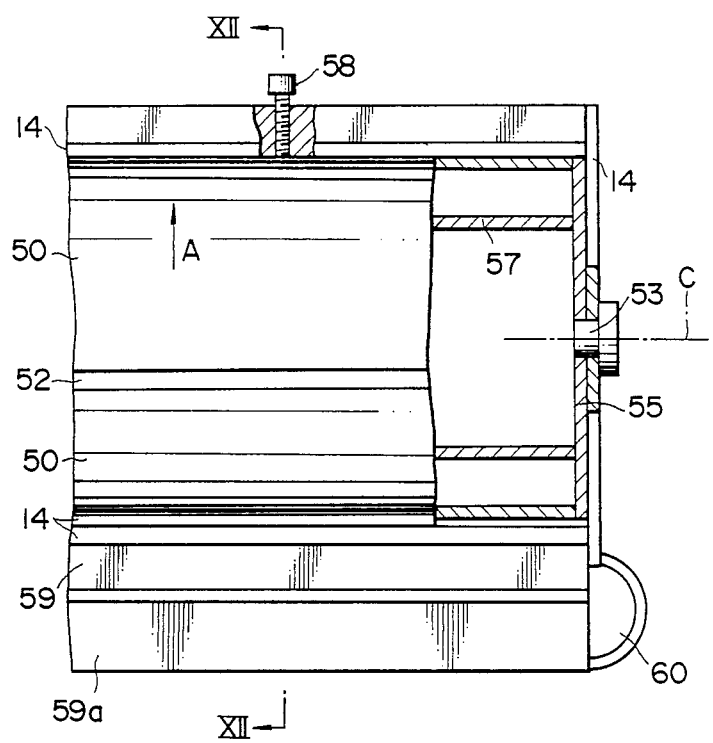
FIG. 13 is a partial plan view of the embodiment of FIG. 12.

FIGS. 12 and 13 illustrates a further embodiment of the outlet means 20. The outlet means 20 includes a cylindrical member 50 mounted in the top of the nozzle 14 for closing the opening 19. The cylindrical member 50 is disposed so that its axis C is oriented in the direction transverse to the direction A along which the printed circuit boards 1 travel. The cylindrical member 50 is provided with an aperture or slit 52 extending axially in parallel with the axis C. Also provided in the cylindrical member 50 is an aperture or hole 51 at a location opposite to the slit 52. Thus, the molten solder supplied in the nozzle 14 is passed through the aperture 51 serving as an inlet and is discharged or ejected from the slit 52 serving as the overflow outlet. The overflowing or ejected molten solder forms a solder wave 13c with which the printed circuit boards 1 are contacted.

In the specific embodiment shown, there is disposed an inner cylinder 57 concentrically within the cylindrical member 50 to define an annular passage through which the molten solder is passed from the inlet 51 to the outlet 52. The overflowing molten slder 13c is collected in a chamber 59 defined by side and bottom plates 59a and is returned to the tank 12 through exits 60 provided in the opposite end of the chamber 59.

The direction of the overflowing or ejected molten solder wave 13c may be varied by adjusting the angular position of the cylindrical member 50. Thus, the opposite ends of the cylindrical member 50 are closed by connecting plates 55 and 56. The plate 56 is rotatably supported by a shaft 54 which is secured to a side wall of the nozzle member 14. The other plate 55 is fixed to a shaft 53 which is rotatably received in a bore of a side wall of the nozzle member 14. As a result of this construction, by turning the shaft 53, the cylindrical member 50 may be rotated about the axis C so that the direction in which the molten solder is ejected (angle $\theta_2$) from the outlet 52 may be adjusted at will. After the adjustment of the direction of the solder wave 13c, the cylindrical member 50 is fixed at that position by turning a screw 58.

The solder wave applicator means 11 described in the foregoing are suitably used as one of the two solder applicators of a dual-stage soldering apparatus in combination with another solder applicator capable of forming a laterally moving progressive wave. One such application is shown in FIG. 14 in which the solder applicator 11 shown in FIG. 12 is used for a secondary soldering step.

Figure 14:
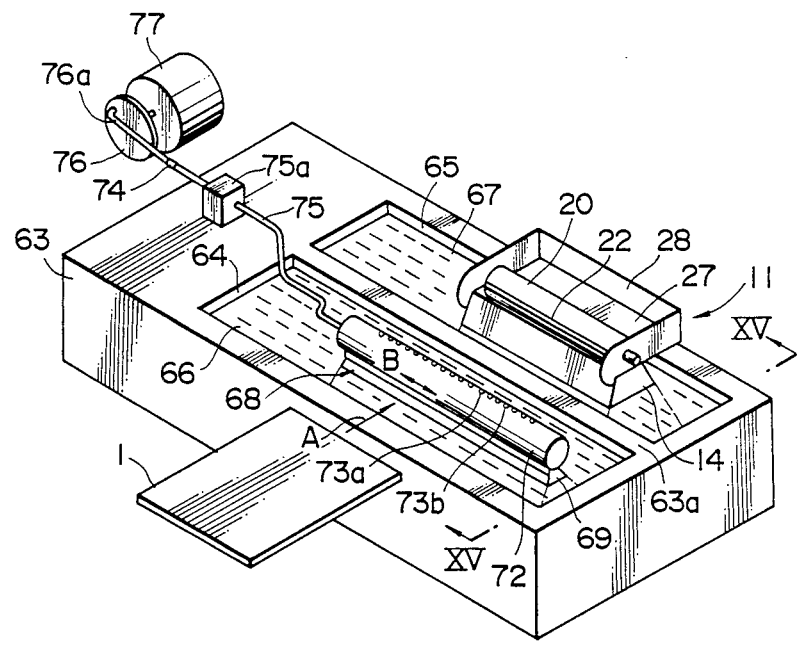
FIG. 14 is a perspective view showing a dual stage soldering apparatus according to the present invention.
Figure 15:
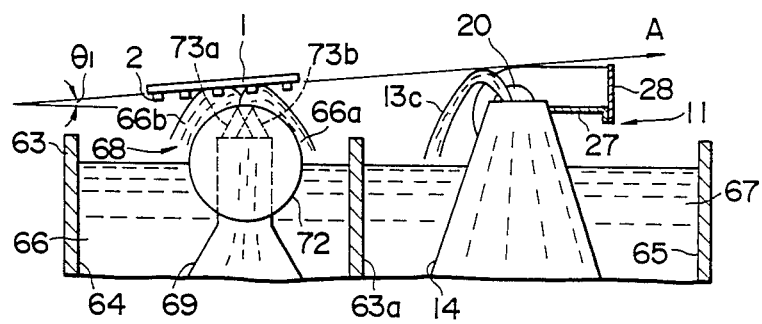
FIG. 15 is a cross-sectional view taken on the line XV—XV in FIG. 14.

Referring to FIGS. 14 and 15, the reference numeral 63 denotes a pot which is generally rectangular in shape and which is open on the top side thereof. The pot 63 is divided by a partition wall 63a into separate first and second tanks 64 and 65 in a tandem fashion, i.e. in a direction parallel with the direction indicated by the arrow A along which printed circuit boards to be soldered are successively moved. The first and second tanks 64 and 65 contain molten solders or melts 66 and 67, respectively. The melts 66 and 67 are maintained at suitable temperatures by heating elements (not shown) such as electric coils. The melts 66 and 67 are repsectively applied to printed circuit boards by first and second solder applicatior means which are generally indicated by reference numerals 68 and 11.

Disposed within the first tank 64 is an upwardly extending riser 69 having at its top end a laterally extending opening on which is slidably mounted a cylindrical nozzle member 72 having a plurality of substantially equally spaced apart overflow throughholes or ports, generally designated 73a and 73b, which are arranged in a direction parallel with the axis of the nozzle member 72 and which are in fluid communication with the riser 69. Means (not shown) are provided so that the molten solder 66 in the tank 64 is continuously introduced into the riser 69 and is forced to overflow from respective ports 73a and 73b to form over the nozzle member 72 standing waves 66a and 66b having a plurality of raised or protruded portions at positions corresponding to the overflowing ports 73a and 73b.

Figure 16:
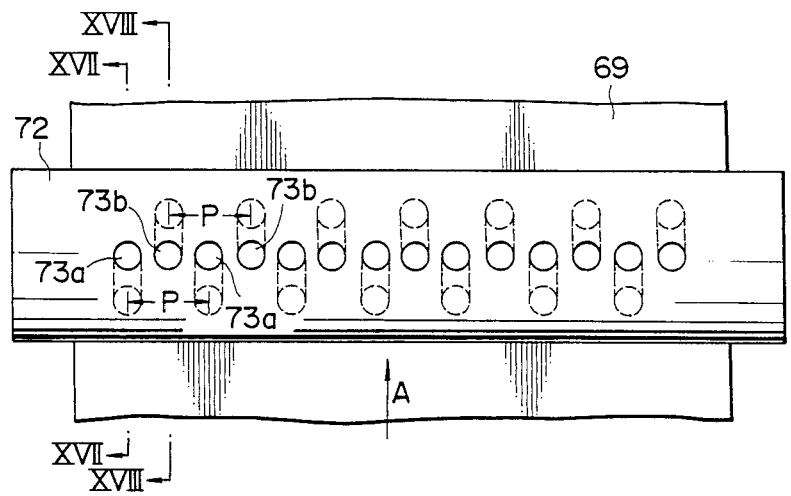
FIG. 16 is a partial top view of the apparatus of FIG. 14.
Figure 17:
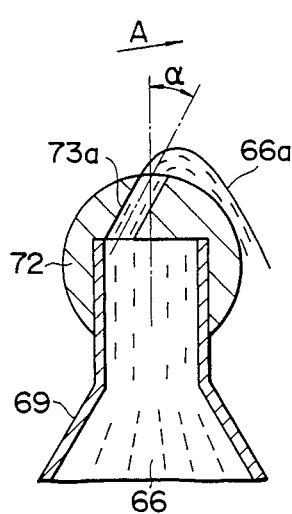
FIGS. 17 and 18 are cross-sectional views taken on the line XVII—XVII and XVIII—XVIII in FIG. 16, respectively.
Figure 18:
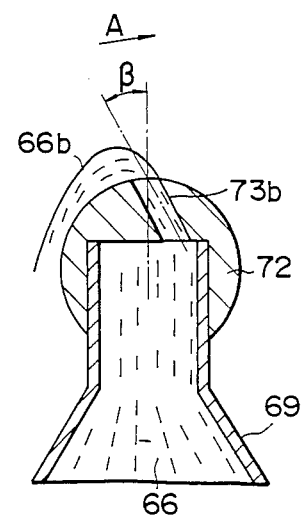
Figure 19:
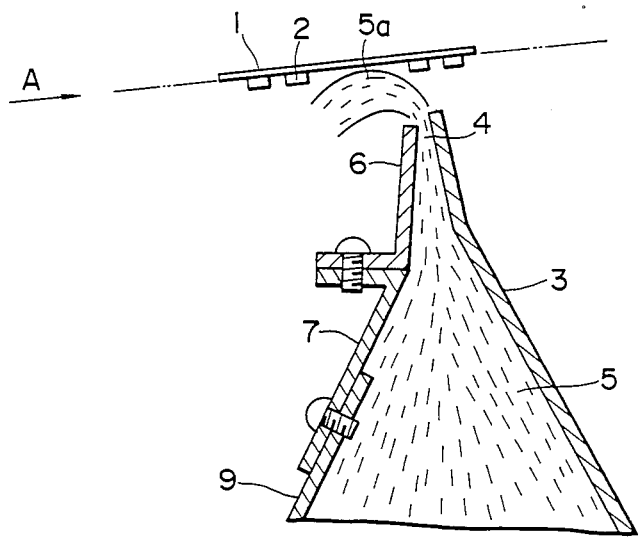
FIG. 19 is a cross-sectional, elevational view schematically showing a known solder overflowing nozzle member.

As shown in FIGS. 16 through 18, the through holes 73a and 73b are alternately arranged in a row and each spaced apart at an equal distance P. The through holes 73a are tilted at an angle alpha toward the direction A, whereas the through holes 73b are tilted at an angle beta in the direction opposite to the direction A. As a consequence of this arrangement, the wave 66a of molten solder overflowing from the through holes 73a is deflected in the same direction A of the travel of the printed circuit boards, while the wave 66b is deflected in the direction opposite to that along which the printed circuit boards travel. The wave 66a is effective in preventing the occurrence of soldering failure at rear ends of chip parts while the wave 66b is effective in preventing the occurrence of soldering failure at front ends of the chip parts.

The orientation angles alpha and beta of the through holes 73a and 73b are selected to provide suitable height of the apices of the waves 66a and 66b. The open ends of the through holes 73a and 73b need not be arranged in one row. They may be arrayed in different rows, i.e. in a zig-zag fashion.

Referring again to FIG. 14, drive means 74 are provided to reciprocally and slidably move the nozzle member 72 in the axial direction, i.e. in a direction transverse to the path of travel A of the printed circuit board 1, as shown by the arrow B, so that the standing waves 66a and 66b of molten solder overflowing from the reciprocally moving ports 73a and 73b form progressive waves progressing in the same direction as the movement of the nozzle member 72. The drive means 74 of this embodiment includes a motor 77 whose drive axis is fixedly secured to a balance wheel 76. A crank shaft 75 is slidably received by a guide 75a provided on the pot 63 and has its one end connected to the nozzle member 72 and its other end pivotally connected to a drive shaft 76a rotatably connected to the balance wheel 76. Upon rotation of the motor 77, the nozzle member 72 is reciprocally displaced. It is preferred that the nozzle member 72 displace in its every half cycle of the reciprocation through a distance substantially equal to an integer multiple of the distance P between the adjacent two overflowing ports 73a (or 73b).

Referring to FIG. 15, the printed circuit boards 1 each having chip-type electric parts 2 temporarily attached to its lower side by means of an adhesive or the like are fed from left to right, as viewed in FIG. 15, or in the direction of the arrow A, along the predetermined path of travel by operation of conventional trnasfer means. As the printed circuit board 1 passes over the first solder applicator 68, its lower side is brought into counter-current and cocurrent contact with the progressive waves 66b and 66a of molten solder for soldering the parts on the underside of the board 1. Since the upper surface of each of the solder waves 66a and 66b is continuously moved in a direction transverse to the direction of the travel of the printed circuit board 1, the molten solder can arrive at the recessed portions of the chip parts-bearing printed circuit board 1 in an accelerated manner without permitting gases to be trapped in those portions.

The printed circuit board 1 which has undergone the soldering treatment with the molten solder 66 in the first solder tank 64 is then passed to the adjacently located second applicator 11 for contact with the second molten solder 67 in the second tank 65 in a manner such as shown in any of FIGS. 4 through 12.

The invention may be embodied in other specific forms without departing from the spirit or essential charcteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

I claim:

1. An apparatus for soldering printed circuit boards moving along a predetermined path of travel, said apparatus comprising:
   an open-topped tank for containing molten solder;
   an upwardly extending nozzle member having the lower end in flow communication with said tank and the upper end defining an opening extending laterally in the direction transverse to said path of travel;
   solder feed means operable for supplying said molten solder in said tank to said nozzle member to cause said molten solder to overflow from said opening, with the underside surface of the printed circuit board being contacted with the overflowing molten solder; and
   outlet means disposed in said opening to reduce the area of said opening and to define a laterally extending outlet, said outlet means including a pair of longitudinally-curved plates rotatably disposed about an axis oriented transversely to said path of travel and defining two laterally-extending apertures between the co-facing laterally-extending longitudinal edges of said plates, one of said apertures forming said outlet and the other aperture serving as an inlet to permit the molten solder introduced into said nozzle member to be passed therethrough to said outlet, said plates being rotatable about said axis independently of each other, whereby by adjusting the angular positions of said curved plates the orientation and the width of said outlet aperture may be varied for adjustment of the flow direction and/or height of said overflowing solder.

2. An apparatus as set forth in claim 1, further comprising means for applying a second molten solder contained in a second tank to the printed circuit board before the printed circuit board is subjected to the soldering treatment by contact with said overflowing molten solder.

3. An apparatus as set forth in claim 2, wherein said means for applying the second molten solder includes an upwardly extending riser having its lower end in flow communication with said second tank, and feed means operable for supplying said second molten solder within said second tank to said riser and for causing said second molten solter to overflow from the upper open end of the riser with the underside of the printed circuit board being contacted with the overflowing second molten solder, said riser being provided at its upper end with a plurality of molten solder-overflowing ports arranged transversely to said path of travel so that the second molten solder overflowing therefrom may form a transversely oriented standing wave having a plurality of protruded surfaces over respective overflowing ports, and said overflowing ports being moveable such that said standing wave may progress in a direction transverse to said path of travel, whereby the underside surface of the printed circuit board is contacted with the progressive wave of the second molten solder overflowing from the moving overflowing ports.

4. An apparatus as set forth in claim 3, wherein said solder-overflowing ports are through holes formed in a cylindrical nozzle member slidably mounted on the upper end of said riser with its axis being oriented transverse to said path of travel, said through holes being alternately oriented in the directions the same as and opposite to the direction of travel of the printed circuit board so that the second molten solder overflowing from said through holes may form a first, transversely oriented wave deflected in the direction of travel of the printed circuit board and a second, transversely oriented wave deflected in the direction opposite to that of travel of the printed circuit board, each of said first and second waves having a plurality of protruded surfaces over respective through holes, and said cylindrical nozzle member being axially moveable so that the first and second waves may progress in a direction transverse to said path of travel of the printed circuit board.

5. An apparatus for soldering printed circuit boards moving along a predetermined path of travel, said apparatus comprising:
   an open-topped tank for containing molten solder;
   an upwardly extending nozzle member having the lower end in flow communication with said tank and the upper end defining an opening extending laterally in the direction transverse to said path of travel;
   solder feed means operable for supplying said molten solder in said tank to said nozzle member to cause said molten solder to overflow from said opening, with the underside surface of the printed circuit board being contacted with the overflowing molten solder; and
   outlet means disposed in said opening to reduce the area of said opening, and to define a laterally extending outlet, said outlet means comprising a longitudinally-curved plate rotatably disposed about an axis located within said nozzle member, upstream from said opening, and oriented transversely to said path of travel, said curved plate coacting with a wall of said nozzle member to define two lateral apertures extending transversely to said path of travel, one of said apertures forming said outlet and being defined between the upper edge of said wall and the lateral edge of said plate downstream from said axis, and the other of said apertures being defined between said wall and the lateral edge of said plate upstream of said axis and serving as an inlet to permit the molten solder introduced into said nozzle member to be passed therethrough to said outlet, whereby by adjusting the angular position of said curved plate the orientation and the width of said outlet may be varied for adjustment of the direction and/or the height of said overflowing solder.

6. An apparatus as set forth in claim 5, wherein the upper edge of said wall is curved in the direction of curvature of said curved plate.

7. An apparatus as set forth in claim 5, further comprising means for applying a second molten solder contained in a second tank to the printed circuit board before the printed circuit board is subjected to the soldering treatment by contact with said overflowing molten solder.

8. An apparatus as set forth in claim 7, wherein said means for applying the second molten solder includes an upwwardly extending riser having its lower end in flow communication with said second tank, and feed means operable for supplying said second molten solder within said second tank to said riser and for causing said second molten solder to overflow from the upper open end of the riser, with the undersise of the printed circuit board being contacted with the overflowing second molten solder, said riser being provided at its upper end with a plurality of molten solder-overflowing ports arranged transversely to said path of travel so that the second molten solder overflowing therefrom may form a transversely oriented standing wave having a plurality of protruded surfaces over respective overflowing ports, and said overflowing ports being movable such that said standing wave may progress in a direction transverse to said path of travel, whereby the underside surface of the printed circuit board is contacted with the progressive wave of the second molten solder overflowing from the moving overflowing ports.

9. An apparatus as set forth in claim 8, wherein said solder-overflowing ports are through holes formed in a cylindrical nozzle member slidaby mounted on the upper end of said riser with its axis being oriented transverse to said path of travel, said through holes being alternately oriented in the directions the same as and opposite to the direction of travel of the printed circuit board so that the second molten solder overflowing from said through holes may form a first, transversely oriented wave deflected in the direction of travel of the printed circuit board and a second, transversely oriented wave deflected in the direction opposite to that of travel of the printed circuit board, each of said first and second waves having a plurality of protruded surfaces over respective through holes, and said cylindrical nozzle member being axially movable so that the first and second waves may progress in a direction transverse to said path of travel of the printed circuit board.

10. An apparatus for soldering printed circuit boards moving along a predetermined path of travel, said apparatus comprising:
an open-topped tank for containing molten solder;
an upwardly extending nozzle member having the lower end in flow communication with said tank and the upper end defining an opening extending laterally in the direction transverse to said path of travel;
solder feed means operable for supplying said molten sold in said tank to said nozzle member to cause said molten solder to overflow from said opening, with the underside surface of the printed circuit board being contacted with the overflowing molten solder; and
outlet means disposed in said opening to reduce the area of said opening, and to define a laterally extending outlet, said outlet means comprising an inner and an outer cylindrical members concentrically positioned to define a molten solder flow passage therebetween and rotatable about an axis oriented transversely to said path of travel to close said opening, said outer cylindrical member being provided with an axially extending slit forming said outlet and with an aperture at a position diametrically opposite to said slit to permit the molten solder introduced into said nozzle member to be passed through said aperture, to said flow passage and to overflow from said slit, whereby by adjusting the angular position of said outer cylindrical member the orientation of said slit may be varied for adjustment of the direction of said overflowing solder.

11. An apparatus as set forth in claim 9, further comprising means for applying a second molten solder contained in a second tank to the printed circuit board before the printed circuit board is subjected to the soldering treatment by contact with said overflowing molten solder.

12. An apparatus as set forth in claim 11, wherein said means for applying the second molten solder includes an upwardly extending riser having its lower end in flow communication with said second tank, and feed means operable for supplying said second molten solder within said second tank to said riser and for causing said second molten solder to overflow from the upper open end of the riser, with the underside of the printed circuit board being contacted with the overflowing second molten solder, said riser being provided at its upper end with a plurality of molten solder-overflowing ports arranged transversely to said path of travel so that the second molten solder overflowing therefrom may form a transversely oriented standing wave having a plurality of protruded surfaces over respective overflowing ports, and said overflowing ports being movable such that said standing wave may progress in a direction transverse to said path of travel, whereby the underside surface of the printed circuit board is contacted with the progressive wave of the second molten solder overflowing from the moving overflowing ports.

13. An apparatus as set forth in claim 12, wherein said solder-overflowing ports are through holes formed in a cylindrical nozzle member slidably mounted on the upper end of said riser with its axis being oriented transverse to said path of travel, said through holes being alternately oriented in the directions the same as and opposite to the direction of travel of the printed circuit board so that the second molten solder overflowing from said through holes may form a first, transversely oriented wave deflected in the direction of travel of the printed circuit board and a second, transversely oriented wave deflected in the direction opposite to that of travel of the printed circuit board, each of said first and second wave having a plurality of protruded surfaces over respective through holes, and said cylindrical nozzle member being axially movable so that the first and second waves may progress in a direction transverse to said path of travel of the printed circuit board.

* * * * *